United States Patent [19]
Shannon et al.

[11] 3,879,321
[45] Apr. 22, 1975

[54] ETHYLENE-VINYL ACETATE AND HIGH CIS-POLYBUTADIENE MODIFIED POLYMERS PREPARED WITH DELAYED MERCAPTAN ADDITION

[75] Inventors: James E. Shannon, Fitchburg; Richard C. Westphal, Leominster, both of Mass.

[73] Assignee: Foster Grant Co., Inc., Leominster, Mass.

[22] Filed: Nov. 16, 1973

[21] Appl. No.: 416,555

Related U.S. Application Data

[63] Continuation of Ser. No. 202,592, Nov. 26, 1971, abandoned, which is a continuation-in-part of Ser. No. 70,891, Sept. 9, 1970, abandoned.

[52] U.S. Cl. ....... 260/23.7 R; 260/23.7 M; 260/874; 260/876 R; 260/880 R
[51] Int. Cl. ....... C08d 9/08; C08f 19/08; C08h 9/08
[58] Field of Search ........ 260/876 R, 876 B, 880 R, 260/880 B, 87.3, 23.7 R

[56] References Cited
UNITED STATES PATENTS

| | | | |
|---|---|---|---|
| 2,497,323 | 2/1950 | Roedel | 260/87.3 |
| 3,129,199 | 4/1964 | Lunk | 260/880 R |
| 3,235,529 | 2/1966 | Nagle | 260/33.6 UA |
| 3,428,712 | 2/1969 | Carrock et al. | 260/880 |
| 3,446,760 | 5/1969 | Nawak et al. | 260/876 R |

Primary Examiner—Murray Tillman
Assistant Examiner—J. Ziegler

[57] ABSTRACT

New polymeric compositions having improved physical and visual properties comprised of impact type monovinyl aromatic polymer containing 1–20% by weight of polybutadiene having a cis-1,4 content of at least 90% and preferably at least 95%, and 1–10% by weight of ethylenevinyl acetate copolymer comprised of 20–50% by weight of vinyl acetate, said impact type polymer having been prepared by mass or mass-suspension polymerization in which a mercaptan chain transfer agent is added to the mixture when about 2 to 15% of the monomer is converted to polymer.

8 Claims, No Drawings

ETHYLENE-VINYL ACETATE AND HIGH CIS-POLYBUTADIENE MODIFIED POLYMERS PREPARED WITH DELAYED MERCAPTAN ADDITION

This is a continuation of application Ser. No. 202,592, filed on Nov. 26, 1971. Application Ser. No. 202,592 is a continuation-in-part of Ser. No. 70,891, filed Sept. 9, 1970. Both prior applications now abandoned.

This invention relates to impact monovinyl aromatic polymer compositions and more particularly to impact polystyrene compositions having improved impact resistance, opacity and processability. Over the past few years a great many manufacturers of small items such as food containers have substituted polymeric materials for substances which were formerly used, such as metal, glass, etc. Because of their low cost, general versatility, and easy disposability, monovinyl aromatic polymers, particularly polystyrene, are among the most widely used polymers in the small container industry.

In spite of the above advantages there are certain applications in which unmodified polymers are not acceptable due to their brittleness and poor impact properties. In such cases impact modifiers, such as rubbery polymeric materials, are usually added to the polymers, either before or subsequently to their polymerization, to impart toughness to them. Unfortunately, there is a limit to the amount of rubbery polymer that can be efficiently incorporated into monovinyl aromatic polymers without resorting to costly operations such as complex polymerization techniques and/or intensive blending procedures such as hot roll milling or Banbury mixing. The considerably increased production costs due to these procedures make it highly desirable to find suitable alternate methods of increasing the impact properties of monovinyl aromatic polymers.

Monovinyl aromatic impact polymer compositions having improved physical and visual properties and which can be easily prepared without resorting to the above-mentioned special processing procedures have now been discovered. Accordingly, it is an object of the invention to present impact monovinyl aromatic polymer compositions having improved impact properties. It is another object of the invention to present impact monovinyl aromatic polymer compositions having improved opacity, whiteness, and other visual properties. These and other objects of the invention will become apparent as the description proceeds.

SUMMARY OF THE INVENTION

According to the invention new thermoplastic compositions are presented which are comprised of about 99 to 50 parts of an alkenyl aromatic polymer, 0.5 to 20 parts of polybutadiene having a cis-1,4 content of at least 90% and preferably at least 95%, and 0.5 to 10 parts of ethylene-vinyl copolymer containing about 20 to 50% by weight vinyl acetate. The preferred formulations contain about 92 to 83 parts of polystyrene, 4 to 12 parts of polybutadiene having a cis-1,4 addition content of at least 95%, and 2 to 5 parts of ethylene-vinyl acetate copolymer containing at least 27% by weight vinyl acetate. The polymers of the invention are prepared by mass polymerizing an alkenyl aromatic monomer, such as styrene in the presence of polybutadiene having a cis-1,4 content of at least 90%, until about 2 to 15% of the monomer is converted to polymer, adding at least 0.005% by weight of a mercaptan monomer weight modifying agent, continuing the mass polymerization until about 20 to 50% of the monomer is converted to polymer, and completing the polymerization by either mass or suspension methods. The ethylene-vinyl acetate copolymer may be added to the polymerization mixture prior to polymerization or it may be blended with the polymerization product.

DESCRIPTION OF THE INVENTION

The alkenyl aromatic polymeric material used in the present invention contains at least 50 and preferably 70% alkenyl aromatic polymer. Such polymers are prepared from compounds having the general formula

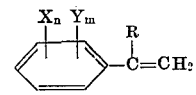

wherein X is a lower alkyl substituent having 1 to 4 carbon atoms, Y is a halogen, $n$ and $m$ are integers of from 0 to 2, and R is hydrogen or the methyl radical. Examples of suitable alkenyl aromatic polymers are the solid homopolymers and copolymers of styrene, vinyltoluene, vinylxylene, isopropyl styrene, tertiarybutyl styrene, ethylvinyl benzene, chlorostyrene, dichlorostyrene, bromostyrene, fluorostyrene, methyl chlorostyrene, alphamethyl styrene, and mixtures of any of these. The preferred alkenyl aromatic monomer is styrene.

Other ethylenic resin producing materials such as acrylonitrile, divinylbenzene, and the esters of acrylic, methacrylic and itaconic acids, such as ethylacrylate, methylmethacrylate and the like may be present in minor amounts up to about 30%, based on the total weight of polymeric components in the composition, and these may be present as homopolymers or as interpolymers with the alkenyl aromatic compound and the polybutadiene. Exemplary of the last class of compounds are the terpolymers of styrene, acrylonitrile and polybutadiene, more commonly known as ABS.

The rubbery component used in the invention is polybutadiene homopolymer having a cis-1,4 addition content of at least 90% and preferably at least 95%. Minor amounts, based on the total rubber content, of other rubbery polymers may be added to the polymerization mixture or blended with the polymerized product provided that they do not interfere with the polymerization or have an undesirable affect on the properties of the product.

In the preferred embodiment of the invention no polymerizable or polymerized compound other than styrene, polybutadiene and ethylene-vinyl acetate copolymer are present in significant amounts.

The ethylene-vinyl acetate copolymer used in the present invention contains about 20 to 50% by weight and preferably at least 27% by weight vinyl acetate. Typical of the ethylene-vinyl acetate copolymers which can be used in the invention are those prepared in accordance with the disclosure of U.S. Pat. No. 2,220,429 issued to Perrin et al on May 14, 1940.

In the compositions of the invention the vinyl aromatic component is present in an amount of about 90 to 50%, based on the total weight of polymeric materials. The cis-1,4-polybutadiene is present in an amount of about 0.5 to 20%, the specific amount being used depending upon the desired end properties of the composition. Compositions containing higher amounts of polybutadiene will naturally have higher impact strengths. In the preferred embodiment the polybutadiene is present in an amount of about 4 to 12% based on the total weight of the polymeric materials in the composition. The ethylene-vinyl acetate copolymer is present in the compositions of the invention in an amount of about 0.5 to 10% by weight, with the preferred range being about 2 to 5%. Amounts of ethylene-vinyl acetate copolymer of less than about 1% or greater than 10% by weight can be used in the invention; however, it has been observed that very little improvement is obtained when amounts less than about 1% of ethylene-vinyl acetate copolymer are employed and that the relative improvement of the product rapidly diminishes as the amount of ethylene-vinyl acetate copolymer is increased by beyond 10%.

The polybutadiene-modified alkenyl aromatic polymers used in the invention are those prepared according to the preferred embodiment of co-pending U.S. Pat. application Ser. No. 850,640, filed on Aug. 15, 1969, now U.S. Pat. No. 3,781,383. According to this embodiment, an alkenyl aromatic compound, such as styrene, having dissolved therein a butadiene homopolymer having a high cis-1,4 content is mass polymerized until about 2 to 15% of the monomer is converted to polymer. A mercaptan molecular weight modifier is then added to the polymerization mixture and the polymerization is completed by mass polymerization techniques or, in an alternate embodiment, the polymerization is permitted to proceed until about 20 to 50% of the monomer is converted to polymer, at which point the polymerization mixture is suspended in an aqueous medium and the polymerization is completed in aqueous suspension. The amount of molecular weight regulating agent added may vary from about 0.005 to 0.5%, based on the combined weight of monomer and rubbery polymer present.

The compositions of the present invention are preferably prepared by blending the ethylene-vinyl acetate copolymer with the polybutadiene-modified alkenyl aromatic polymer. It has been discovered that it is usually satisfactory to simply preblend the ingredients in a blender, such as a drum tumbler, and then extrude the blended mixture at a temperature of about 300° to 600°F. No additional working other than extrusion is generally necessary. When the compositions of the invention are prepared by this procedure it is desirable that the particle size of the rubber particles in the alkenyl aromatic polymer is between about 0.25 to 10 microns and it has been observed that the maximum benefit is obtained when the rubbery particle size is between 1 and 5 microns and in the most preferred polymeric composition, polybutadiene-modified polystyrene, the particle size of the major portion of the rubber particles is about 1 to 2 microns.

The compositions of the invention may also be prepared by adding the alkylene-vinyl acetate copolymer to the polymerization formulation, if it is so desired. In this procedure the ethylenevinyl acetate copolymer and the polybutadiene are dissolved in the alkenyl aromatic monomer and polymerization is initiated and carried out as described above. One advantage of this method of preparing the compositions of the invention is that it is not necessary to provide a separate blending step to uniformly disperse the ethylene-vinyl acetate copolymer throughout the polybutadiene-containing alkenyl aromatic polymer. The presence of the ethylenevinyl acetate copolymer in the alkenyl aromatic monomer, e.g. styrene, polymerizing system does not appear to hinder in any way the polymerization of the monomer.

Non-polymeric substances such as fillers, plasticizers, coloring agents, antioxidants, etc., may be added to the composition if so desired. For instance, plasticizers such as mineral oil, butyl stearate, or other suitable plasticizing agents can be incorporated into the polymeric composition by any suitable means, as by mechanical blending. The selection and amounts of additives may be varied, depending upon the particular properties sought in the final composition.

The polymeric compositions of the present invention have unusually good physical and visual properties, For instance, by incorporating small amounts of ethylene-vinyl acetate copolymer into the impact alkenyl aromatic polymer composition, prepared as described above, the impact properties of the resulting compositions are improved as much as 30% or more. In addition, other important properties of mono-alkenyl aromatic polymers made in accordance with the teachings of the present invention are considerably improved. Thus, the polymeric compositions of this invention have a considerably greater opacity and whiteness, and accordingly lower amounts of opacity-increasing agents and whitening agents need be incorporated in them to impart a given degree of opacity and whiteness to an impact polymeric composition than was formerly used in the otherwise identical formulation. Equally important, the drawability of alkenyl aromatic polymer compositions prepared in accordance with the present invention is greatly improved. This property, which, for purposes of this discussion, may be defined as the capability of thermoplastic sheet material to be drawn, as by vacuum means, to a film of very thin cross-section is of great importance in the thermoforming industry in operations such as blow molding and vacuum forming. It has been observed that the surface characteristics and wall thickness uniformity of thin walled containers prepared from sheeted alkenyl aromatic polymeric materials by the vacuum thermoforming technique are greatly improved.

The following examples illustrate specific embodiments of the present invention and some of the benefits that are obtained by the use of the polymeric compositions of the invention. Where parts and percentages are expressed, these are on a weight basis unless otherwise specified. The physical testing was conducted in accordance with the specifications of the American Society for Testing Materials (A.S.T.M.). The Izod impact strength tests were run on standard notched impact bars ½ × ⅛ × 5 inches, in accordance with A.S.T.M. D256–56, and the results are reported in ft.-lbs./inch of notch. The melt index, reported in grams per 10 minutes, was determined by the procedure set forth in A.S.T.M. D–1238–62T (condition H). The Vicat softening point, reported in degrees centigrade, was determined by A.S.T.M. method D–1525–58T. The tensile strength at fail, reported in psi, was run in accordance with A.S.T.M. D–638–64T.

EXAMPLE I

A

Nine parts of polybutadiene rubber having a cis-1,4 content of about 98% is dissolved in 91 parts of styrene.

To this solution is added 0.25 part of lubricant and 0.15 part of antioxidant, and polymerization of the mixture is initiated by raising the temperature to about 105°C. After about 5½% of the styrene is polymerized, 0.085 part of dodecyl mercaptan is added to the polymerizing mixture and the polymerization is continued for about 9 hours, after which the charge is cooled to approximately 70°C. and dumped into a second polymerization reactor equipped with an agitator and containing about 53 parts of water, 0.25 part of electrolyte, 0.20 part of suspending agent and about 2 parts of plasticizer. The pH of the aqueous solution is adjusted to about 3 and agitation of the reaction mixture is commenced and adjusted such that a stable suspension is established and maintained. A peroxide catalyst (0.12 part), is added to the mixture, the reactor is pressurized with nitrogen to 20 p.s.i.g. and the charge is heated to about 110°C. and held at that temperature for about 5 hours. The charge is then cooled and the reaction product, consisting of small uniform spherical beads of impact polystyrene, is separated from the aqueous suspension, washed and dried.

A portion of the material prepared in Part A is extruded in a 1½ inches laboratory extruder and pelletized. Physical test specimens are prepared from the pelletized material and tested in accordance with the specifications of the A.S.T.M. The results are reported in Table I, col. 1.

EXAMPLE II

A mixture of 95 parts of the impact polystyrene prepared in part A of Example I, and 5 parts of ethylene-vinyl acetate copolymer containing about 28% vinyl acetate, sold by E. I. duPont deNemours & Co. under the trademark Elvax 250, is dry blended for about 30 minutes. The mixture is extruded in a 1½ inches laboratory extruder and pelletized. Physical test specimens are molded from the pelletized material and tested in accordance with the specifications of the A.S.T.M. The results are reported in Table I, col 2.

EXAMPLE III

The procedure of Example 2 is repeated except that 6 parts of ethylene-vinyl acetate copolymer containing about 33% vinyl acetate (sold by E. I. duPont de Nemours & Co. under the trademark Elvax 150) is blended with 94 parts of the impact polystyrene prepared in part A of Example I. Physical test specimens are prepared from the pelletized material and tested in accordance with the specifications of the A.S.T.M. The results are reported in Table I, col. 3.

EXAMPLE IV

The procedure of Example II is repeated except that 2 parts of ethylene-vinyl acetate copolymer containing about 28% vinyl acetate (sold by E. I. duPont de Nemours & Co. under the trademark Elvax 210) is blended with 98 parts of the impact polystyrene prepared in Example I part A. Physical test specimens are prepared from the pelletized material and tested in accordance with the specifications of the A.S.T.M. The results are reported in Table I, col. 4.

Examples II to IV illustrate preferred embodiments of the invention. Table I shows that the Izod impact value of a polymer prepared according to the invention containing 5% of ethylene-vinyl acetate copolymer (column 2) is considerably higher than the impact value of a composition made from the same polymer but which does not contain ethylene-vinyl acetate copolymer. Similar increases in impact strength are obtained when other ethylenevinyl acetate copolymers are incorporated into impact polystyrene (Table I, columns 3 and 4) prepared in accordance with the invention.

TABLE I

| Component, % | 1 | 2 | 3 | 4 |
|---|---|---|---|---|
| Impact polystyrene | 100 | 95 | 94 | 98 |
| Ethylene-vinyl acetate copolymer | — | 5 | 6 | 2 |
| Physical Test Results | | | | |
| Melt Index, gms/10 minutes | 1.01 | 1.11 | 1.18 | 1.17 |
| Izod Impact Strength, ft.lbs./inch | 2.46 | 3.26 | 2.95 | 2.80 |
| Vicat Softening Point, °C. | 98.6 | 98.5 | 95.8 | 95.0 |
| Tensile Strength at fail, psi | 3286 | 3193 | 2820 | 3033 |

EXAMPLE V

Physical test specimens were made from pellets prepared from a polymeric composition containing 95 parts of crystal polystyrene and 5 parts of Elvax 250 in accordance with the procedure of Example I. Physical test specimens were made from a second polymeric composition prepared in the same manner except that the Elvax 250 was omitted from the formulation. The specimens were tested in accordance with the A.S.T.M. specifications and the results are reported in Table II.

Table II

| Component,% | Run A | Run B |
|---|---|---|
| Crystal polystyrene | 100 | 95 |
| Elvax 250 | — | 5 |
| Physical Test Results | | |
| Melt Index, gms/10 minutes | 2.63 | 2.67 |
| Izod Impact Strength, ft. lbs./inch | 0.40 | 0.36 |
| Vicat Softening Point, °C. | 96.4 | 99.7 |
| Tensile Strength at fail, psi | 7113 | 6767 |

This example demonstrates that the impact strength of the sample prepared from the crystal polystyrene - ethylenevinyl acetate copolymer is not improved but, on the contrary, is reduced by about 10%. The other physical properties have not been appreciably changed by the presence in the crystal polystyrene of the ethylene-vinyl acetate copolymer.

EXAMPLE VI

Run A

Polymeric pellets were prepared in accordance with the procedure of Example I except that only 2.7 parts of ethylene-vinyl acetate copolymer was used in the formulation. A portion of this material was extruded into sheets having a thickness of 60 mils. Test containers of rectangular cross-section were vacuum formed from the sheet material, the sheet material being drawn to a depth of about 3 inches. The internal surfaces of the mold were carved to product embossed lettering and raised design on the outside surfaces of the formed containers.

Run B

Test containers were prepared in accordance with the above procedure from impact polystyrene except that the ethylene-vinyl acetate copolymer was omitted from the formulation.

The test containers prepared in Runs A and B were visually examined and compared. It was observed that the Run A containers had greater opacity than the Run B containers. The Run A containers exhibited better draw characteristics than the Run B containers, that is, the Run A containers exhibited very few draw lines while those prepared in Run B had considerably more draw lines. The lettering and design appearing on the Run A containers were much sharper and better defined than that appearing on the Run B containers. The Run A containers also had a smoother surface and fewer blemishes than the Run B containers.

This example demonstrates that the visual characteristics of impact polystyrene molding compositions are greatly improved by incorporating therein minor amounts of ethylene-vinyl acetate copolymer. It also demonstrates that the draw properties of impact polystyrene under thermal forming conditions are greatly improved when ethylene-vinyl acetate copolymer is added to the formulation.

We claim:

1. A moldable polymeric composition consisting essentially of:
   a. plasticizer,
   b. about 0.5 to 10 parts of ethylene-vinyl acetate copolymer containing about 27 to 50% by weight vinyl acetate and,
   c. about 99.5 to 90 parts of polybutadiene modified alkenyl aromatic polymeric composition which has been prepared by
      i. mass polymerizing an alkenyl aromatic monomer in the presence of polybutadiene having a cis-1,4 content of at least about 90% until about 2 to 15% by weight of the monomer is converted to polymer, said alkenyl aromatic monomer having the formula:

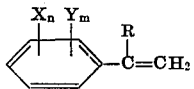

wherein X is a $C_1$–$C_4$ alkyl; Y is halogen; n and m are integers of from 0 to 2 and R is hydrogen or methyl,
      ii. adding about 0.005 to 0.5%, based on the combined weight of monomer and polybutadiene, of a mercaptan molecular weight regulating agent which is an alkyl mercaptan of about 1–24 carbon atoms, and
      iii. continuing the mass polymerization until about 20 to 50% of the monomer has been converted to polymer, and thereafter continuing the polymerization by mass or suspension procedures.

2. A moldable polymeric composition consisting essentially of:
   a. plasticizer,
   b. about 0.5 to 10 parts of ethylene-vinyl acetate copolymer containing about 27 to 50% by weight vinyl acetate, and
   c. about 99.5 to 90 parts of polybutadiene modified alkenyl aromatic polymeric composition which has been prepared by:
      i. dissolving said polybutadiene in an alkenyl aromatic monomer of the formula:

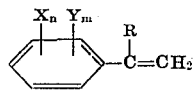

wherein X is $C_1$–$C_4$ alkyl; R is H or methyl; Y is halogen; and n and m are integers of from 0 to 2,
      ii. prepolymerizing the polybutadiene-monomer solution by mass polymerization, and adding to the polymerization mixture about 0.005 to about 0.5% by weight based on the total weight of monomer and polybutadiene of an alkyl mercaptan of about 1 to 24 carbon atoms at least 0.005% of which is first added when about 2 to 15% of the monomer has been polymerized and the remainder of which is optionally added subsequently in one or more increments,
      iii. continuing the mass prepolymerization until about 25 to about 50% by weight of the monomer has been converted to polymer; and
      iv. continuing the polymerization by either mass or suspension procedures.

3. The composition of claim 2 wherein said alkenyl aromatic monomer is styrene.

4. The composition of claim 2 wherein said mercaptan is added in a concentration of about 0.005 to 0.25% based on the combined weight of monomer and polymer.

5. The composition of claim 2 wherein said polybutadiene has a cis-1,4 content of at least 95%.

6. The moldable polymeric composition of claim 2 consisting essentially of:
   a. 0.5 to 10 parts of ethylene-vinyl acetate copolymer containing about 27 to 50% by weight vinyl acetate and
   b. 99.5 to 90 parts of polybutadiene-modified polystyrene, said polybutadiene having a cis-1,4 content of at least about 90% and said polybutadiene-modified polystyrene having been prepared by mass polymerizing styrene in the presence of said polybutadiene until about 3 to 12% of the monomer is converted to polymer, adding about 0.05 to 0.25% based on a combined weight of monomer and polybutadiene of an alkyl mercaptan molecular weight regulating agent containing about 1 to 24 carbon atoms, continuing the mass polymerization until about 20 to 50% of the monomer has been converted to polymer, suspending the polymerization mixture in an aqueous medium and completing the polymerization in aqueous suspension.

7. The composition of claim 6 wherein said polybutadiene-modified polystyrene is comprised of about 92 to 83 parts of polystyrene and 4 to 12 parts of polybutadiene having a cis-1,4 content of at least 95%.

8. The composition of claim 6 wherein said ethylene-vinyl acetate is present in an amount of about 2 to 5 parts and it contains at least 27% by weight vinyl acetate.

* * * * *